(12) United States Patent
Ryu et al.

(10) Patent No.: US 8,896,176 B2
(45) Date of Patent: Nov. 25, 2014

(54) ROTOR OF A MOTOR

(75) Inventors: Woongseon Ryu, Seoul (KR);
Hyunseop Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 120 days.

(21) Appl. No.: 13/483,866

(22) Filed: May 30, 2012

(65) Prior Publication Data

US 2013/0020898 A1    Jan. 24, 2013

(30) Foreign Application Priority Data

Jul. 22, 2011   (KR) .................. 10-2011-0072977
Aug. 10, 2011   (KR) .................. 10-2011-0079464

(51) Int. Cl.
*H02K 1/28*    (2006.01)
*H02K 1/27*    (2006.01)

(52) U.S. Cl.
CPC .................. *H02K 1/276* (2013.01); *H02K 1/28* (2013.01); *H02K 2201/06* (2013.01)
USPC .............................. 310/156.09; 310/216.123

(58) Field of Classification Search
USPC .......... 310/156.09, 156.22, 216.116, 216.123
See application file for complete search history.

(56) References Cited

U.S. PATENT DOCUMENTS

| 2,680,822 | A  | * | 6/1954  | Brainard ................ 310/216.123 |
| 4,585,967 | A  | * | 4/1986  | Mayer et al. ........... 310/216.123 |
| 4,792,713 | A  | * | 12/1988 | Bush ...................... 310/216.123 |
| 6,265,802 | B1 | * | 7/2001  | Getschmann .......... 310/216.004 |
| 6,388,353 | B1 | * | 5/2002  | Liu et al. ................ 310/156.09 |
| 7,417,348 | B2 | * | 8/2008  | Taniguchi et al. ....... 310/156.53 |
| 7,923,881 | B2 | * | 4/2011  | Ionel et al. .............. 310/156.83 |
| 7,948,133 | B2 | * | 5/2011  | Fu ........................... 310/156.09 |
| 8,234,776 | B2 | * | 8/2012  | Lopez .......................... 29/598 |
| 2010/0013350 | A1 | * | 1/2010 | Fu .............................. 310/261.1 |

* cited by examiner

*Primary Examiner* — Dang Le
(74) *Attorney, Agent, or Firm* — Saliwanchik, Lloyd & Eisenschenk

(57) ABSTRACT

Provided is a rotor core of a motor, the rotor core, the rotor core including: a thin disk-shaped rotor core member; a shaft hole penetratively formed in a center of the rotor core member; a shaft press-fitted into the shaft hole; a plurality of magnet insertion holes penetratively formed at a position near to a periphery of the rotor core member for inserted coupling by a magnet; a plurality of teeth protrusively formed at an inner circumferential surface of the shaft hole, and a skived portion protrusively formed at a position corresponding to the plurality of teeth of the shaft, wherein the rotor core members are stacked each at a predetermined height, and the shaft is press-fitted into the shaft hole.

11 Claims, 5 Drawing Sheets

ROTOR OF A MOTOR

CROSS-REFERENCE TO RELATED APPLICATIONS

This application claims the benefit under 35 U.S.C. §119 of Korean Patent Application Nos. 10-2011-0072977, filed Jul. 22, 2011 and 10-2011-0079464, filed Aug. 10, 2011, which are hereby incorporated by reference in their entirety.

BACKGROUND

1. Field of the Disclosure

The present disclosure relates to a rotor core for motor.

2. Discussion of the Related Art

This section provides background information related to the present disclosure which is not necessarily prior art.

In general, a rotor of a BLDC (Brushless direct current) motor is formed by press-fitting a shaft into a rotor core formed by being stacked with thin rotor core members. At this time, a surface of the shaft is performed with a surface treatment using mechanical means, e.g., knurling or skiving to inhibit the stacked rotor core and the shaft from idling. Once the shaft is surface-treated with knurling or skiving, press-fit force, pull-off force and resistance to rotational force are determined by interference between the surface treatment and a shaft hole of the rotor core.

Meantime, in case of the rotor core formed by stacking a plurality of disk-shaped rotor core members, a single rotor core having a predetermined height may be formed to be press-fitted into a skived shaft. In a case where a rotor core with more than a predetermined length is used, the rotor core is modularized at each predetermined height for easy press-fitting process, and sequentially press-fitted.

However, in case of sequential press-fitting of rotor cores, the skived surface of the shaft may be damaged in the press-fitting process of a first rotor core module, a sufficient interference cannot be reacted on second and third rotor core modules as calculated in design, and coherence between the rotor core and the shaft is not sufficiently formed to cause the shaft and the core to idle during rotation of rotor, whereby accurate power transmission and control cannot be realized.

It is, therefore, desirable to overcome the above problems and others by providing an improved rotor core of a motor.

BRIEF SUMMARY

This section provides a general summary of the disclosure, and is not a comprehensive disclosure of its full scope or all of its features.

The present disclosure has been made to solve the foregoing problem(s) of the prior art, and therefore an object of certain embodiments of the present invention is to provide a rotor core of a motor configured to maintain a predetermined level of coherence between a shaft and the rotor core by improving a shaft surface and a shape of an inner diameter of the rotor core.

In one general aspect of the present disclosure, there is provided a stacked rotor core of a motor, the rotor core comprising: a thin disk-shaped rotor core member; a shaft hole penetratively formed in a center of the rotor core member; a shaft press-fitted into the shaft hole; a plurality of magnet insertion holes penetratively formed at a position near to a periphery of the rotor core member for inserted coupling by a magnet; and a plurality of teeth protrusively formed at an inner circumferential surface of the shaft hole, wherein the rotor core members are stacked each at a predetermined height, and the shaft is press-fitted into the shaft hole.

Preferably, but not necessarily, at least three or more teeth are protrusively formed at the inner circumferential surface of the shaft hole.

Preferably, but not necessarily, a total of six teeth is protrusively formed at the inner circumferential surface of the shaft hole, each 60 degrees apart.

Preferably, but not necessarily, an angle formed by two sides of a tooth extended toward a center of the inner circumferential surface of the shaft hole is 15 degrees, and an angle between imaginary extension lines passing a center of adjacent teeth is 60 degrees.

Preferably, but not necessarily, a total of eight magnet insertion holes is formed about a circumference of the rotor core member.

Preferably, but not necessarily, the imaginary extension line connected by the center of shaft hole and a center of the magnet insertion hole is not overlapped by an imaginary extension line connected by the center of shaft hole and a center of the tooth.

Preferably, but not necessarily, the number of teeth increases as a diameter of the shaft hole increases, and decreases as the diameter of the shaft hole decreases.

Preferably, but not necessarily, a distance between distal ends of each facing tooth corresponds to a diameter of a rotor core member reception portion of the shaft.

Preferably, but not necessarily, a periphery of the rotor core member reception portion of the shaft inserted into the shaft hole is smoothly formed without any separate post-processing.

In another general aspect of the present disclosure, there is provided a stacked rotor core of a motor, the rotor core comprising: a thin disk-shaped rotor core member; a shaft hole penetratively formed in a center of the rotor core member; a shaft press-fitted into the shaft hole; a plurality of magnet insertion holes penetratively formed at a position near to a periphery of the rotor core member for inserted coupling by a magnet; a plurality of teeth protrusively formed at an inner circumferential surface of the shaft hole, and a skived portion protrusively formed at a position corresponding to the plurality of teeth of the shaft, wherein the rotor core members are stacked each at a predetermined height, and the shaft is press-fitted into the shaft hole.

Preferably, but not necessarily, at least three or more teeth are protrusively formed at the inner circumferential surface of the shaft hole.

Preferably, but not necessarily, a total of six teeth is protrusively formed at the inner circumferential surface of the shaft hole, each 60 degrees apart.

Preferably, but not necessarily, an angle formed by two sides of a tooth extended toward a center of the inner circumferential surface of the shaft hole is 15 degrees, and an angle between imaginary extension lines passing a center of adjacent teeth is 60 degrees.

Preferably, but not necessarily, a total of eight magnet insertion holes is formed about a circumference of the rotor core member.

Preferably, but not necessarily, the imaginary extension line connected by the center of shaft hole and a center of the magnet insertion hole is not overlapped by an imaginary extension line connected by the center of shaft hole and a center of the tooth.

Preferably, but not necessarily, the number of teeth increases as a diameter of the shaft hole increases, and decreases as the diameter of the shaft hole decreases.

Preferably, but not necessarily, a distance between distal ends of each facing tooth corresponds to a diameter of a rotor core member reception portion of the shaft.

Preferably, but not necessarily, the stacked rotor core of the motor further comprises: a first rotor core stacked with a predetermined number of rotor core members; a second rotor core stacked with the same number of rotor core members as that of the first rotor core, and protrusively formed with a plurality of teeth at a second position having a predetermined angle difference from that of the first position; and a third rotor core stacked with the same number of rotor core members as that of the first rotor core, and protrusively formed with a plurality of teeth at a third position having a predetermined angle difference from that of the second position.

Preferably, but not necessarily, the angle difference between teeth of the first and second rotor cores is same as that between teeth of the second and third rotor cores.

Preferably, but not necessarily, the skived portion includes a first skived portion formed at a position corresponding to that of the teeth of the first rotor core, a second skived portion formed at a position corresponding to that of the teeth of the second rotor core, and a third skived portion formed at a position corresponding to that of the teeth of the third rotor core.

The rotor core of motor according to the present disclosure has an advantageous effect in that moldability, evenness and accuracy of rotor core of motor are excellent because a shape of an inner diameter of the stacked rotor core is determined by a shape determined by a mold shape of the rotor core.

Another advantage is that the a skived portion is formed only at a surface opposite to a contacted tooth portion after the shaft is press-fitted, and no interference is made with the skived portion in a case teeth of other rotor cores are press-fitted, thereby inhibiting the skived portion from being unnecessarily damaged in the course of being press-fitted.

Still another advantage is that there occur no additional manufacturing costs and processes, because it is sufficient to change a shape of a mold used in a punching process used in the manufacturing of the conventional rotor core.

Particular and preferred aspects of the present disclosure are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present disclosure will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

Figure 1:
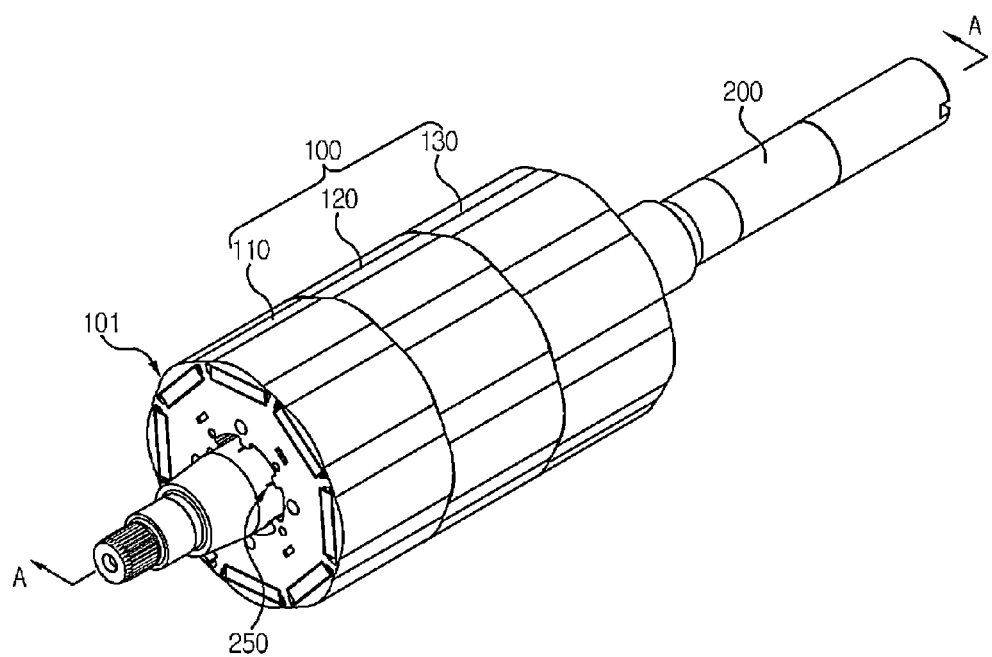
FIG. 1 is a schematic perspective view illustrating an assembled state of a rotor core according to a first exemplary embodiment of the present disclosure.

The disclosed embodiments and advantages thereof are best understood by referring to FIGS. 1-6 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first", "second", and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. As may be used herein, the terms "substantially" and "approximately" provide an industry-accepted tolerance for its corresponding term and/or relativity between items.

Hereinafter, a rotor motor of motor according to the present disclosure will be described in detail with reference to the accompanying drawings.

Hereinafter, the present disclosure will be described based on an example of a BLDC motor among many motors, however, configuration of BLDC motor has nothing to do with the subject matter of the present disclosure, such that a detailed description of the BLDC motor will be omitted and a stacked rotor core of a motor, which is the characteristic configuration of the present disclosure, will be concentratively described.

Figure 2:
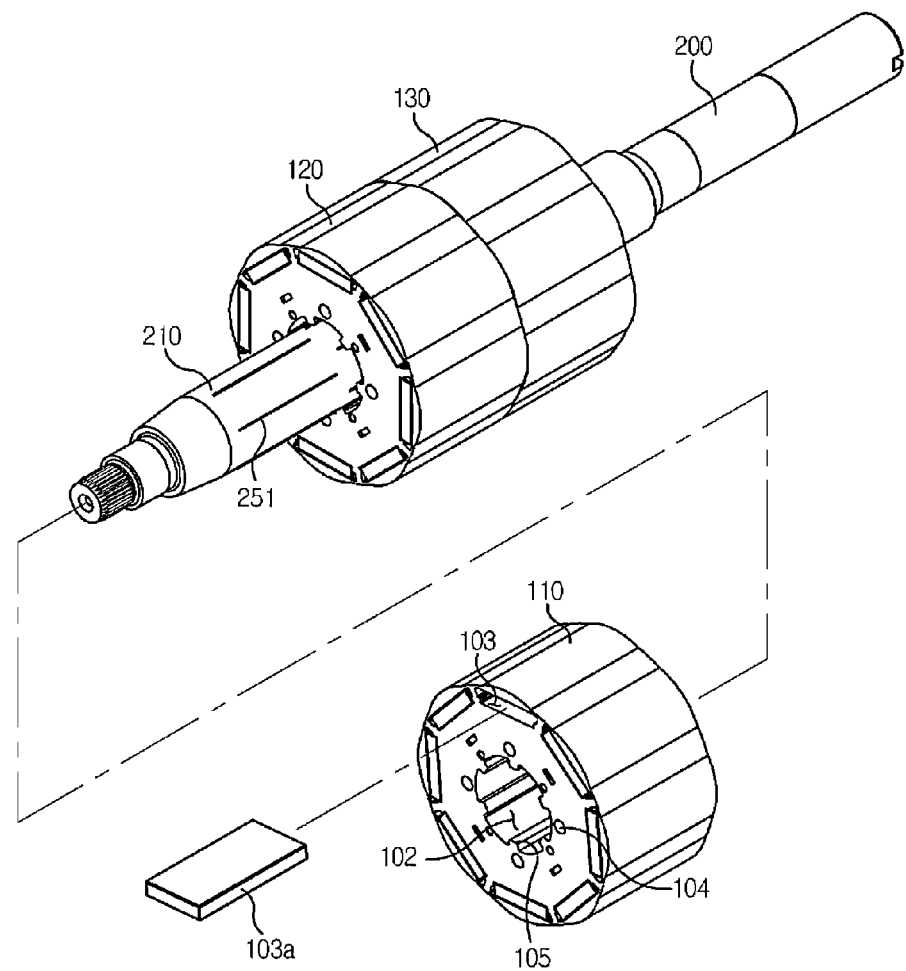
FIG. 2 is an exploded perspective view of FIG. 1.
Figure 3:
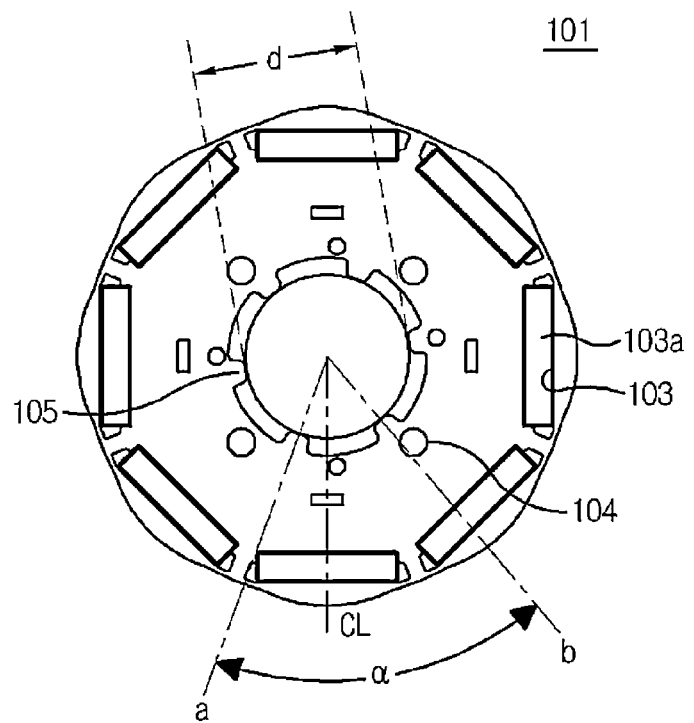
FIG. 3 is a plan view illustrating the rotor core of FIG. 1.
Figure 4:
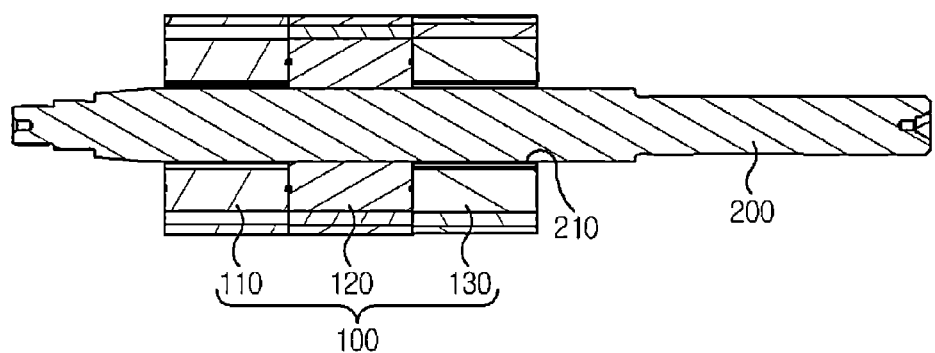
FIG. 4 is a cross-sectional view taken along line A-A of FIG. 1.
Figure 5:
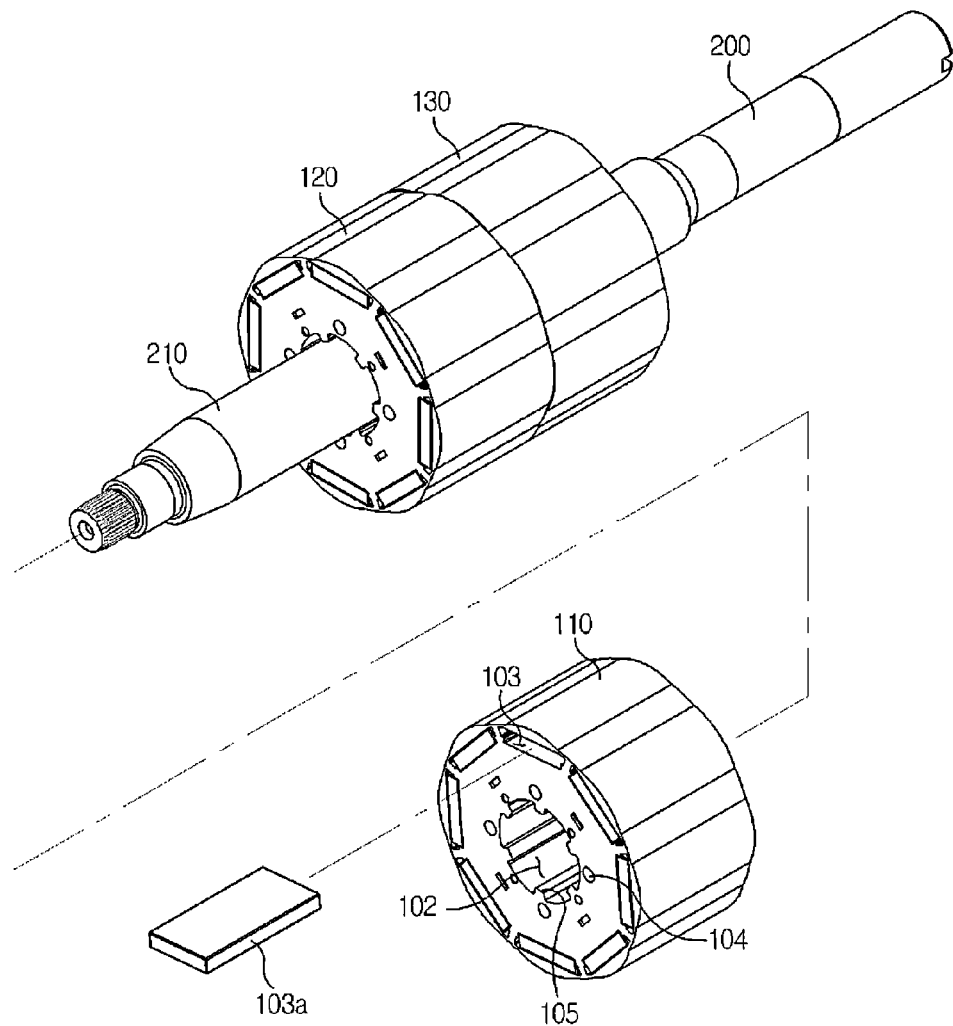
FIG. 5 is an exploded perspective view of a rotor core according to a second exemplary embodiment of the present disclosure.
Figure 6:
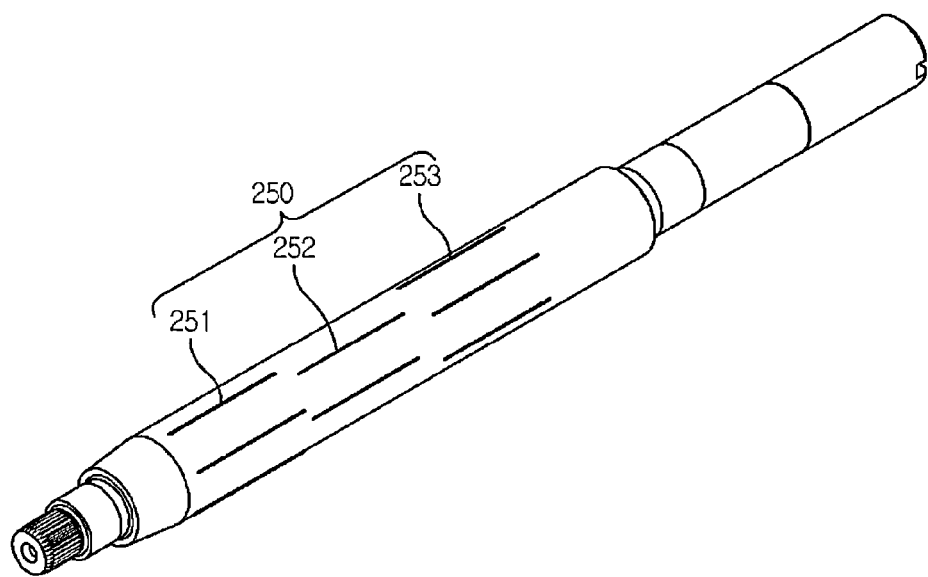
FIG. 6 is a schematic perspective view illustrating a shaft having a skived portion according to a second exemplary embodiment of the present disclosure.

FIG. 1 is a schematic perspective view illustrating an assembled state of a rotor core according to a first exemplary embodiment of the present disclosure, FIG. 2 is an exploded perspective view of FIG. 1, FIG. 3 is a plan view illustrating the rotor core of FIG. 1, FIG. 4 is a cross-sectional view taken along line A-A of FIG. 1, FIG. 5 is an exploded perspective view of a rotor core according to a second exemplary embodiment of the present disclosure, and FIG. 6 is a schematic perspective view illustrating a shaft having a skived portion according to a second exemplary embodiment of the present disclosure.

Referring to FIGS. 1 and 2, a stacked rotor core of a motor includes a stacked rotor core (100) provided with a plurality of rotor core members (101) and a shaft (200).

The rotor core member (101) takes a shape of a thin iron plate with a thickness of approximately 0.5 mm. The rotor core member (101) is formed by punching a thin iron plate, and a plurality of rotor core members is stacked to form the rotor core (100).

Referring to FIG. 1, the rotor core (100) is formed with first, second and third rotor cores (110, 120, 130) stacked with the rotor core members (101) each at a predetermined height and each at a predetermined angle of deviation, through which a shaft (200) is press-fitted.

A shaft hole (102) is formed at a center of the rotor core member (101) to allow the shaft (200) to pass therethrough. The shaft hole (102) is preferably formed with an approximately round shape.

A magnet insertion hole (103) is penetratively formed at a position near to a periphery of the rotor core member (101). The magnet insertion hole (103) is inserted and coupled by a magnet (103a) insertedly coupled to a direction parallel with a center shaft of the shaft hole (102). Preferably, a plurality of magnet insertion holes (103) is penetratively formed each at a predetermined interval, and according to an exemplary embodiment of the present disclosure, a total of regular octagonal magnet insertion holes (8 pieces, 103) is preferably formed along a periphery of the rotor core member (101).

Meanwhile, the number of magnet insertion holes (103) may increase or decrease depending on changed size of rotor core, in addition to the number of total of eight magnet insertion holes, such that the number of magnet insertion holes may include a regular pentagon (5 pieces), a regular hexagon (6 pieces) or more than a regular octagonal magnet insertion holes (8 pieces).

A fixing pin hole (104) is provided to allow a fixing pin (not shown) to be inserted therethrough, in a case each stacked rotor core member (101) is coupled by the fixing pin coupling each rotor core. The fixing pin hole (104) is preferably formed with a through hole having a diameter of approximately 2~3 mm. A plurality of fixing pin holes (104) is preferably formed, and as shown in the drawing, it is preferred that the plurality of fixing pin holes be diagonally formed. For example, as shown in FIG. 3, in a case where four fixing pin holes (104) are provided, each fixing pin hole is horizontally and vertically diagonal relative to a center of the shaft hole (102), such that imaginary extension lines connecting each facing fixing pin hole (104) are orthogonal.

A plurality of teeth (105) is protrusively formed at an inner circumferential surface of the shaft hole (102) each at a predetermined height toward the center of the shaft hole (102). A height of each tooth (015) may vary, but preferably the height of each tooth (015) is formed in the range of 1~2 mm.

If the height of the tooth (105) is too high, an area at a distal end of the tooth (105) contacting the shaft (200) is narrowed, and if the height of the tooth (105) is too low, an area at a distal end of the tooth (105) contacting the shaft (200) is excessively broadened to make it difficult for the shaft (200) to be inserted into the insertion hole.

According to an exemplary embodiment of the present disclosure, a plurality of teeth (105) is protrusively formed at the inner circumferential surface of the shaft hole (102) as illustrated in FIG. 3, and it is more preferable that a total of six (6) teeth be formed at the inner circumferential surface of the shaft hole (102) at a 60 degree interval. In this case, an angle formed by two sides of a tooth extended toward a center of the inner circumferential surface of the shaft hole is 15 degrees, and an angle ($\alpha$) between imaginary extension lines (a, b) passing a center of adjacent teeth is 60 degrees.

Meanwhile, the above mentioned dimensions are relevant to the exemplary embodiment of the present disclosure, such that the dimensions never restrict the scope of the present disclosure whatsoever. For example, the number of teeth (105) preferably increases as a diameter of the shaft hole (102) increases, and preferably decreases as the diameter of the shaft hole (102) decreases.

Three or more teeth (105) are preferably provided. That is, if a diameter of the shaft hole (102) is small, and less than three teeth are formed, there is a chance that the shaft (200) idles inside the shaft hole (102).

Meanwhile, the imaginary extension line (CL) connected by the center of shaft hole and a center of the magnet insertion hole is not overlapped by an imaginary extension line (a) connected by the center of shaft hole and a center of the tooth. However, this configuration is not limited thereto, and the extension lines may be overlapped depending on increased or decreased number of teeth (105).

Furthermore, a distance (d) between distal ends of each facing tooth (105) preferably corresponds to a diameter of a rotor core member reception portion (210) of the shaft (200). The distance (d) may have some tolerances as occasion demands. However, if the tolerance is too excessive, the shaft (200) is difficult to be inserted into the shaft hole (102) of the stacked rotor core members (101), such that the tolerance is preferred not to exceed 0.1 mm.

Still furthermore, a surface of the periphery of the rotor core reception portion (210) of the shaft inserted into the shaft hole (102) is preferably smoothed without any additional processing. That is, although the shaft (200) was conventionally inhibited from idling inside the shaft hole (102) through a surface treatment using mechanical means, e.g., knurling or skiving on the periphery of the rotor core reception portion (210), the function is performed by the teeth (105).

Particularly, as shown in the cross-sectional view of FIG. 4, in a case the first, second and third rotor cores (110, 120, 130) are twistedly coupled to the shaft (200) at a predetermined angle, the teeth (105) densely support the periphery of the rotor core reception portion (210) of the shaft (200) to obtain an effect as that of increasing the number of teeth.

The present disclosure thus configured has an excellent effect in that a support structure is formed at an inner circumferential surface of the shaft hole (102) of the rotor core member (101) capable of inhibiting the shaft (200) from idling by changing only the shape of a mold formed by punching of the conventional rotor core member (101), thereby enhancing the accuracy after manufacturing of a rotor assembly even without the post-processing of the shaft (200) and making mechanical and electrical characteristics of an entire BLDC motor more excellent.

Meanwhile, as shown in the cross-sectional view of FIG. 4, in a case the first, second and third rotor cores (110, 120, 130) are twistedly coupled to the shaft (200) at a predetermined angle, the tooth (105) alternatively interferes the surface of the rotor core reception portion (210) of the shaft (200), whereby a press-fitting force between the rotor core (110) and the shaft (200) can be enhanced.

In another exemplary embodiment of the present disclosure, the shaft (200) may include the rotor core reception portion (210) coupled to the first, second and third rotor cores (110, 120, 130), and a skived portion (250) protrusively formed at a position facing the tooth (105) of the surface of the rotor core reception portion.

At this time, the skived portion (250) is preferably processed only at a position corresponding to the tooth (105). That is, although an external surface of the rotor core reception portion (210) is conventionally performed with a surface treatment using mechanical means, e.g., knurling or skiving to inhibit the shaft (200) from idling inside the shaft hole (102), the skived portion (250) is formed only at a portion where the tooth (105) is brought into contact in the present disclosure.

Therefore, in a case where the rotor core (110) formed with the first, second and third rotor cores (110, 120, 130) is press-fitted per module in the present exemplary embodiment of the present disclosure, a first skived portion may be formed at a surface corresponding to the tooth (105) of the first rotor core (110), and second and third skived portions (252, 253) may be formed at surfaces corresponding to teeth (105) of the second and third rotor cores (120, 130).

As apparent from the foregoing, the present disclosure has an industrial applicability in that a support structure is formed at an inner circumferential surface of the shaft hole (102) of the rotor core member (101) capable of inhibiting the shaft (200) from idling by changing only the shape of a mold formed by punching of the conventional rotor core member (101), and the skived portion (150) is formed at the surface of the shaft (200) corresponding thereto, whereby the first skived portion (251) interfering with the tooth (105) of the first rotor core (110) does not interfere with the teeth (105) of the second and third rotor cores (120, 130) during insertion of the first rotor core (110), such that the second and third rotor cores (120, 130) can be forcedly coupled to the shaft (200) at an interference as intended in the design.

Although the foregoing has described and exemplified a BLDC motor, the present disclosure is not limited thereto, and other types of motors using rotors may be applied with the novel concept of the present disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. A rotor of a motor, the rotor comprising:
    a rotor core member including a shaft hole; and
    a shaft press-fitted into the shaft hole, the shaft comprising a skived portion on a surface thereof;
    wherein the rotor core member comprises:
    a plurality of rotor core plates, each including the shaft hole in a center thereof and stacked at a predetermined height;
    a plurality of magnet insertion holes formed at a position near to a periphery of a rotor core plate of the plurality of rotor core plates;
    a plurality of magnets arranged in the plurality of magnet insertion holes; and
    a plurality of first teeth protrusively formed at an inner circumferential surface of the shaft hole,
    wherein the skived portion is arranged at a position corresponding to the plurality of first teeth of the shaft hole,
    wherein an outer circumferential surface of the shaft is in contact with the plurality of first teeth, and
    wherein a gap is present between the outer circumferential surface of the shaft and the inner circumferential surface of the shaft hole where the plurality of first teeth is not formed.

2. The rotor of claim 1, wherein at least three or more first teeth are protrusively formed at the inner circumferential surface of the shaft hole.

3. The rotor of claim 2, wherein a total of six first teeth are protrusively formed at the inner circumferential surface of the shaft hole, each 60 degrees apart.

4. The rotor of claim 3, wherein an angle formed by two sides of a first tooth extended toward a center of the inner circumferential surface of the shaft hole is 15 degrees, and an angle between imaginary extension lines passing a center of adjacent teeth is 60 degrees.

5. The rotor of claim 4, wherein the imaginary extension line connected by the center of the shaft hole and a center of the magnet insertion hole is not overlapped by an imaginary extension line connected by the center of the shaft hole and a center of the first tooth.

6. The rotor of claim 4, wherein a distance between distal ends of each facing first tooth corresponds to a diameter of a rotor core member reception portion of the shaft.

7. The rotor of claim 1, wherein a total of eight magnet insertion holes are formed about a circumference of the rotor core plate.

8. The rotor of claim 1, wherein the number of first teeth increases as a diameter of the shaft hole increases, and decreases as the diameter of the shaft hole decreases.

9. The rotor of claim 1, wherein the rotor of the motor further comprises:
    a first rotor core stacked with a predetermined number of rotor core members;
    a second rotor core stacked with the same number of rotor core members as that of the first rotor core, and protrusively formed with a plurality of second teeth at a second position having a predetermined angle difference from that of the first position; and a third rotor core stacked with the same number of rotor core members as that of the first rotor core, and protrusively formed with a plurality of third teeth at a third position having a predetermined angle difference from that of the second position.

10. The rotor of claim 9, wherein the angle difference between the first teeth and the second teeth is same as that between second and third teeth.

11. The rotor of claim 9, wherein the skived portion includes a first skived portion formed at a position corresponding to that of the first teeth of the first rotor core, a second skived portion formed at a position corresponding to that of the second teeth of the second rotor core, and a third skived portion formed at a position corresponding to that of the third teeth of the third rotor core.

* * * * *